April 20, 1965 W. MÜLLER 3,179,418

MAGNETIC SOUND RECORDING AND REPRODUCING DICTATION APPLIANCE

Filed April 3, 1961 4 Sheets-Sheet 1

MAGNETIC SOUND RECORDING AND REPRODUCING DICTATION APPLIANCE

Filed April 3, 1961

4 Sheets-Sheet 3

April 20, 1965 W. MÜLLER 3,179,418

MAGNETIC SOUND RECORDING AND REPRODUCING DICTATION APPLIANCE

Filed April 3, 1961 4 Sheets-Sheet 4

United States Patent Office 3,179,418
Patented Apr. 20, 1965

3,179,418

MAGNETIC SOUND RECORDING AND REPRODUCING DICTATION APPLIANCE

Willy Müller, Zurich, Switzerland, assignor to Phono-Electric AG., Zug, Switzerland Filed Apr. 3, 1961, Ser. No. 100,186
Claims priority, application Switzerland, Feb. 9, 1961, 1,555/61
7 Claims. (Cl. 274—4)

The present invention relates to a magnetic sound recording and reproducing dictation appliance of the type having a transducer head which by the aid of a helical guide groove provided on a sleeve of magnetizable material is shifted along a overhung-mounted rotatable drum, which moves the said sleeve in a direction perpendicular to the direction of the shifting part of the said transducer head for the purpose of recording or reproducing sound.

In a known dictation appliance of this kind the said sleeve forms a wide, loose loop around the said drum contacting only a cylindrical segment of the said drum at the range where it co-operates with the said transducer head. In such dictation appliances foldable sleeves cannot be used since such sleeves have to be completely tensioned in order to obviate noises at the folding lines. For such sleeves one may provide tensioning means consisting substantially of two rolls spaced apart by spring bias, which however involves comparatively complicated and expensive constructions.

It is the main object of the present invention to provide a simple, economic and extraordinarily easily operated dictation appliance of the kind described which allows in particular the use of foldable magnetic sound recording sleeves.

With these and other objects in view which will become apparent later from this specification and the accompanying drawings, I provide a magnetic sound recording and reproducing dictation appliance comprising in combination: a basic frame, and expansible clamping drum overhung-mounted rotatably on the said frame, an operating knob arranged at the free end of said drum controlling the effective outer diameter of a sleeve of magnetizable material and having a helical guide groove on its circumference in operation clamped on said drum, a transducer head mounted slidably parallel to the said drum and pivotally relative to the same and in operation engaging the said guide groove, the said operating knob being kinematically coupled to the said transducer head in the sense of automatically lifting the same off the said drum when operated to reduce the effective diameter of the said drum for the purpose of fitting or removing the said sleeve.

These and other features of my said invention will be readily understood from the following description of a preferred embodiment thereof given by way of example with reference to the accompanying drawings, in which.

Figure 1:
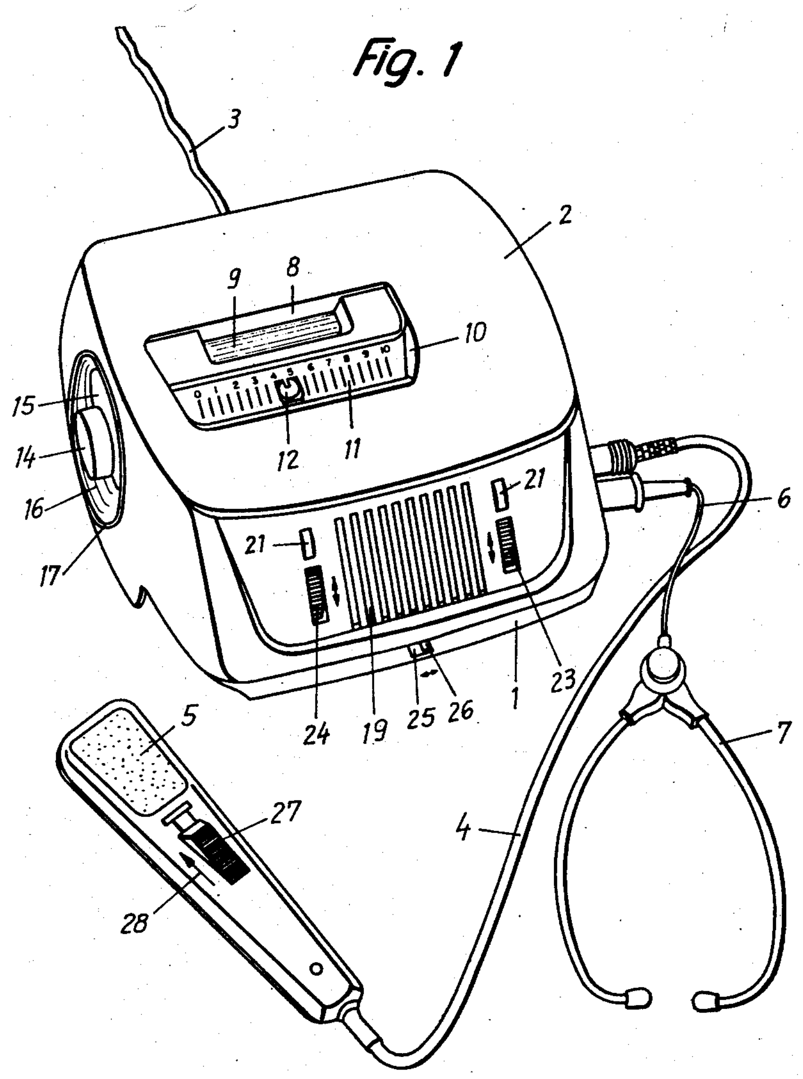
FIG. 1 is a perspective illustration of a dictation appliance.

The dictation appliance illustrated has a basic frame 1 and casing 2 made of synthetic material detachably attached to the same. A cable 3 serves for connection to the electric mains. A plug-in cable 4 leads to a microphone 5, and another plug-in cable 6 leads to a head phone 7. For reproduction a pedal switch of any known type may be connected to the appliance instead of the microphone 5.

The casing 2 has on top an oblong open window 8 through which part of a clamping drum 9 is visible. Moreover through another open window 10 a scale 11 is visible on which a pointer 12 indicates the position of a transducer head 13 (see FIG. 2) along the clamping drum 9. The clamping drum 9 has an operating knob 14 which protrudes from a central opening 15 (see FIG. 1) of a dished round lid 16 mounted on the left hand side of the casing. This lid has a bead 17 on its periphery on which it may be gripped in order to take it off the casing and thereby to expose an opening in the casing the diameter of which is larger than the outer diameter of the clamping drum 9, so that a magnetic sound recording sleeve 18 (see FIGS. 6 and 7) may be inserted through this opening and fitted to the clamping drum, or removed from the same. For this purpose the user may push the sleeve with the fingers of one hand at its outer circumference through the window, while pushing or pulling the same with the other hand at its end face, so that the fitting or removing of the sleeve can be effected extremely conveniently.

In the middle of the frontal portion of the casing 2 a grid 19 is provided behind which a loudspeaker 20 is arranged. Behind two coloured windows 21 arranged symmetrically to the grid 19 two signal lamps 22 are arranged which light up simultaneously when the appliance has been connected to the mains voltage by means of a mains switch of which only the actuating member 23, designed as a knurled knob, is shown. The knurled knob 23 serves not only for the switching on and off of the appliance as a whole but also for operating a tone control, i.e., a sound filter device, by means of which the modulated voltages of higher or lower frequency may be adjusted as regards their relative intensity. A further knurled knob 24 arranged symmetrically of the knurled knob 23 with respect to the grid 19 and likewise protruding only in part from the casing 2 is the actuating member of a sound volume adjuster otherwise not shown. Below the grid 19 a slider knob 26 protrudes from a cut-out 25 of the basic frame 1 which in its right hand side position as illustrated effects the reproduction of the sound recordings by the loudspeaker 20, while by shifting this knob 26 to the left the reproduction is effected by the microphone 5 itself, which is of the electrodynamic types.

The microphone 5 has in the usual manner a slider knob 27 with four positions, illustrated in the "stop" position. When shifting the knob 27 in the direction of the arrow 28, it rests itself in at a "recording" position, in which one has to talk into the microphone, in order to record the desired recordings on the magnetic sound recording sleeve 18. When shifting the knob 27 from the "stop" position in the direction opposite to the arrow 28, it rests itself in at a "reproducing" position, in which the recordings on the sleeve 18 are reproduced, depending on the position of the knob 26, through the loudspeaker 20 or through the microphone 5. From the "reproducing" position the knob 27 may be shifted further in the direction opposite to that of the arrow 28 into a "repetition" position, at which the knob 27 does not, however, rest itself in but has to be held against the bias of a spring tending to restore it to the "reproducing"

position. In the "repetition" position the clamping drum 9 is turned in the reverse so that by releasing the knob 27 and returning the same to the "reproducing" position that part of the recordings is repeated which had been reproduced last, this part being the larger, the longer the knob 27 had been held in the "repetition" position.

When the microphone 5 is replaced in a conventional way by a pedal switch operated by a user typing on a typewriter the dictation recorded, this pedal switch naturally likewise has the positions required for "halt," "reproducing" and "repetition."

Figure 2:
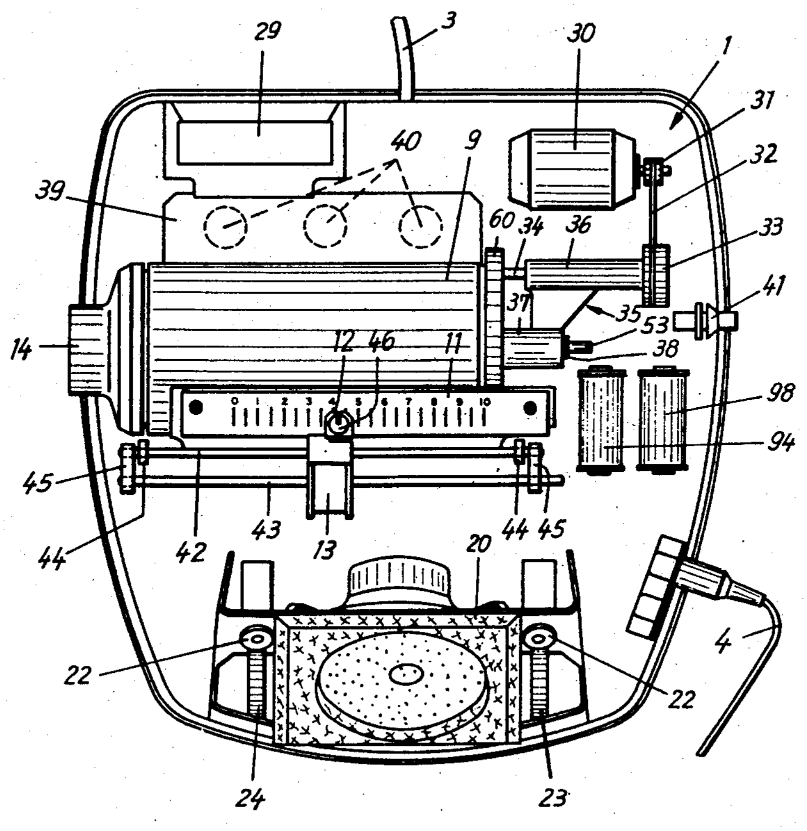
FIG. 2 is a plan view thereof with the casing removed and with some details omitted.

In FIG. 2 only some principal components of the appliances are diagrammatically illustrated while certain details will be explained with reference to other figures, and the electrical circuits are not shown at all, since their realisation will offer no difficulties to a person skilled in the art after the explanation of how the appliance functions.

A mains coupling device 29 serves for transforming the alternating voltage of the mains and rectifying the same into the direct voltage of for example 15 volts as required for the various circuits of the appliance. A motor 30 drives an endless cord 32 through a pinion 31 on a pulley 33 which serves at the same time as a flywheel of a lay-shaft 34. A bearing bracket 35 has a bearing 36 journalling the lay-shaft 34 and a clamp 37 for a hollow shaft 38 on which the clamping drum 9 is journalled rotatably. The hollow shaft 38 is connected to the basic frame 1 only at its right hand side and supported in the clamp 37 so that the clamping drum 9 is overhung-mounted as required for the fitting and removing of the sleeve 18 as described.

An effacer magnet 39 having a narrow air gap (not shown in the drawing) extending over the full length of the clamping drum 9 and provided with three energizing coils 40 may be operated by depressing a key 41, whereby the effacer magnet 39 is energized and the clamping drum 9 is turned, so that the recordings on the magnetic sound recording sleeve fitted on the latter are effaced.

Figures 3, 5, 6, 7, 9:
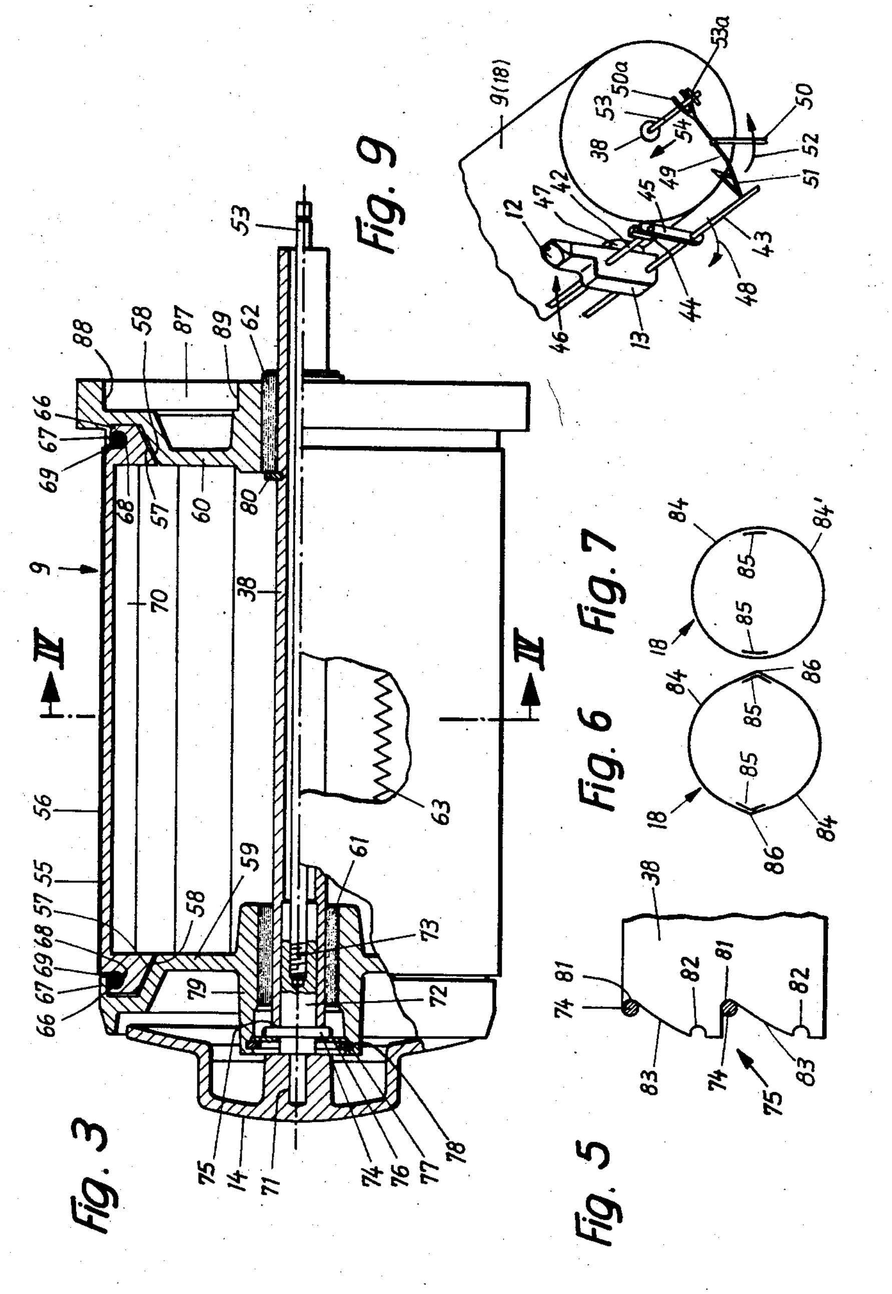
FIG. 3 is a longitudinal part-section, partly broken-off of the clamping drum.
FIG. 5 is a diagrammatic development of one end of a hollow shaft.
FIG. 6 is a transverse section of a foldable magnetic sound recording sleeve prior to being tensioned by the clamping drum.
FIG. 7 is the same section as FIG. 6 after tensioning by the clamping drum.
FIG. 9 shows a detail of a transducer head lifting-off mechanism in a diagrammatic perspective illustration.

The transducer head 13 serving for the recording and reproducing is slidably mounted on two bars 42 and 43 arranged parallel to the clamping drum 9. The bar 42 is fixed to two supports 44, and on its ends lying outside these supports 44 two parallel arms 45 are pivotally mounted which carry at their ends the bar 43. The pointer 12 is desgned as a press- and shift-key being provided with a shallow recess 46 for receiving a finger tip. By depressing the key 12 the transducer head may be swung about the bar 42, and thereby its recording- and scanning-member 47 (see FIG. 9) may be lifted off the clamping drum 9 or the sleeve fitted on the latter, respectively. A spring (not shown) tends to keep the transducer head 13 or its member 47, respectively in contact with the drum 9 or sleeve 18, respectively, as long as the key 12 is not depressed. In the latter case naturally, by swinging the transducer head 13 about the bar 42 also the bar 44 and the arms 45 are rocked, as indicated in FIG. 9 by the arrow 48.

Conversely, by turning the bar 44 in the sense of the arrow 48 the transducer head 13 may likewise be lifted off the drum 9 without having to depress the key 12. For this purpose a lever 49 (not shown in FIG. 2) is provided, which is pivotal about a vertical axle 50 and a ramp 51 at one of its arms, which upon turning the lever 49 in the sense of the arrow 52 gets under that end of the bar 43 which projects beyond the right hand side arm 45.

By the ramp 51 running up on this end of the bar the transducer head 13 is lifted off the drum 9. This lifting-off is effected automatically by an axle 53, which passes through the hollow shaft 38 and is pulled a stretch further into this hollow shaft 38 in the direction of the arrow 54, when in a manner described later in more detail the drum 9 is contracted by means of the operating knob 14 in order to fit the sleeve 18 to it or to remove the same from it. For turning the lever 49 a dog 53*a* is arranged at the end of the axle 53 which cooperates with the forked end 50*a* of the right hand side arm of the lever 49.

It should also be remarked that the sleeve 18 has a helical guide groove of very small helical pitch which is engaged by the member 47 of the transducer head by rotation of the drum 9 with the sleeve 18 fitted on it, the transducer head 13 is accordingly shifted in one direction or the other of the scale 11, depending on the sense of rotation of the drum 9, namely to the right for recording or reproducing, and to the left when running the drum 9 in the reverse preparatory to repetition.

Figure 4:
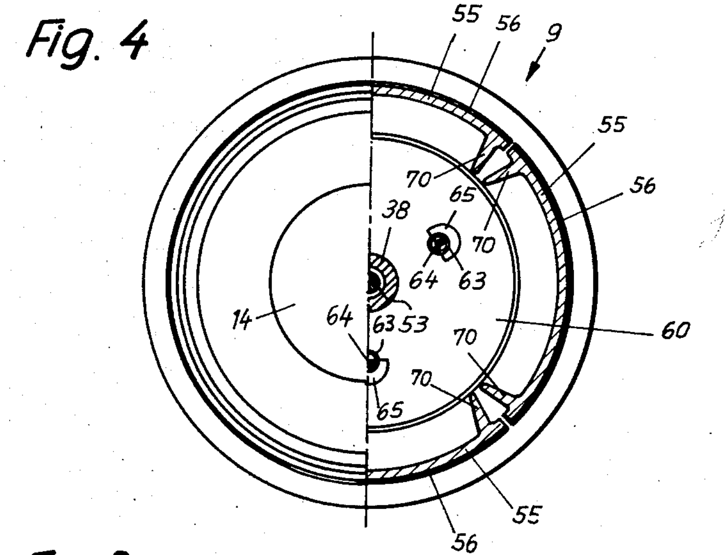
FIG. 4 is an end elevation, partly in section on the line IV—IV of FIG. 3.

With reference to FIGS. 3–5 the special construction of the clamping drum 9 will now be described, and it should be noted, that clamping drums are known in themselves but have been used hitherto only for the clamping-on of rigid hollow cylindrical gramophone rolls, and were designed in a comparatively complicated manner. The present clamping drum 9 has four circumferential segments 55 of synthetic material each occupying an aperture angle of about 90° and provided at their outer circumference with a felt layer 56 stuck on as a whole or deposited in flakes, in order to secure a wider contact of the sleeve 18 on the circumference of the drum. The drum segments 55 are provided at their ends with two internal conical surfaces 57 of opposite conicity which are capable of sliding on corresponding external conical surfaces 58 of two end discs 59 and 60, which are journalled on the stationary hollow shaft 38 with bearing bushes 61 and 62 of sintered metal interposed.

The end discs 59 and 60 are connected to one another by three tension springs 63 arranged parallel to the hollow shaft 38 the ends of which are hooked on projections 64 extending into holes 65 of these discs. The springs 63 tend to make the discs 59 and 60 approach one another, so that their conical faces 58 force the drum segments 55 radially outward by sliding on the conical faces 57 thereof, until quarter-cylindrical abutments 66 provided on the ends of said segments abut from inside the abutment flanges 67 provided on the discs 59 and 60. In this position the clamping drum has its largest diameter, so that a sleeve 18 fitted on it is firmly clamped fast.

At the two abutment faces 66 annular grooves 68 are provided in which rubber rings 69 are embedded tending to pull the drum segments 55 inward, i.e., to detach the same from the sleeve 18, when the two discs 59 and 60 are moved apart against the bias of the springs 63. The drum segments 55 moreover have longitudinal ribs 70 serving merely for stiffening the same.

The operating knob 14, which consists of synthetic material, is pressed at 71 on a pin 72 which projects into the left hand side end of the hollow shaft 38 and is screwed on to the left hand side end of the axle 53. A transverse pin 74 fitted into the pin 12 protrudes on both sides from the pin 72, and its ends contract the left hand side end face of the hollow shaft 38 which is designed as a face cam 75 (see also FIG. 5). On the side of the transverse pin 74 averted from the face cam 75 there is an annular washer 76 which abuts at the right hand side near its bore the transverse pin 74, and a circular clip 77 on the left hand side next its periphery. The circular clip 77 is arranged in an annular groove 78 provided at the left hand side end of the hub 79 of the end disc 59, and thus arrests the washer 76 on this hub 59. At the left hand side of the bearing bushing 62 a circular clip 80 is provided on the hollow shaft 38 which restrains the end disc from moving to the left. It will accordingly be seen that the transverse pin 14 is forced by the tension springs 63 through the components 59 and 79–76 against the face cam 75, the shape of which will be seen from the diagrammatic developed view according to FIG. 5.

The face cam 75 has two equal sections each extending over 180° and each having an inner rest 81, an outer rest 82, and a ramp 83 extending between these two rests, the two ends of the transverse pin 74 lying at any time at two corresponding points of the said two sections of the face cam. In FIG. 3 it is assumed that the transverse pin 74 has rested itself into the inner rests 81 which correspond to the shortest spacing of the discs 59 and 60 and accordingly to the largest diameter of the clamping drum 9, as explained hereinabove. When turning the operating knob 14 and accordingly also the pin 72 and the axle 53 in the clockwise sense, the transverse pin 74 slides over the ramps 83 until it rests itself into the rests 82, thereby carrying with it the end disc 59 by the end of the components 76–79 against the bias of the springs 63. Owing to the larger distance of the discs 59 and 60 from one another the rubber rings 69 can now pull the drum segments 55 inwards, so that the clamping drum 9 assumes its smallest diameter. When in this condition a sleeve 18 is pushed over the drum 9 and then the knob 14 is turned on in the same sense, i.e., always in the clockwise sense; the transverse pin 74 drops back into the inner rests 81, and the sleeve 18 is clamped securely in place.

The magnetic sound recording sleeve 18 consists of two foils 84 of equal length consisting of magnetizable material which are connected to one another at their ends by foldable adhesive strips 85 and are provided on their outside with the aforesaid guide groove. When the sleeve is pushed over the drum 9 it is not quite circular but has a slight kink 86 at each of the folds as illustrated greatly exaggerated in FIG. 6. After the clamping on of the drum 9 the sleeve 18 is however completely circular, as shown in FIG. 7, and is moreover accurately centered since the drum segments 55 move quite uniformly in radial directions.

In contrast to clamping devices previously provided for such sleeves consisting of two drums preloaded against one another by means of the springs the present clamping device comprising a single drum has the great advantage of a much quieter run of the sleeves completely free from vibrations with considerably improved sound quality. Owing to this vibration-free running the speed of the sleeve relative to the transducer head can be reduced at least to half its value, so that a smaller sleeve suffices or a sleeve of the former size has a much larger recording capacity.

Obviously non-foldable sleeves could likewise be clamped on the drum 9, but foldable sleeves have the great advantage of being capable of being dispatched in the folded condition like a letter in an envelope, and of being stored more conveniently.

Figure 8:
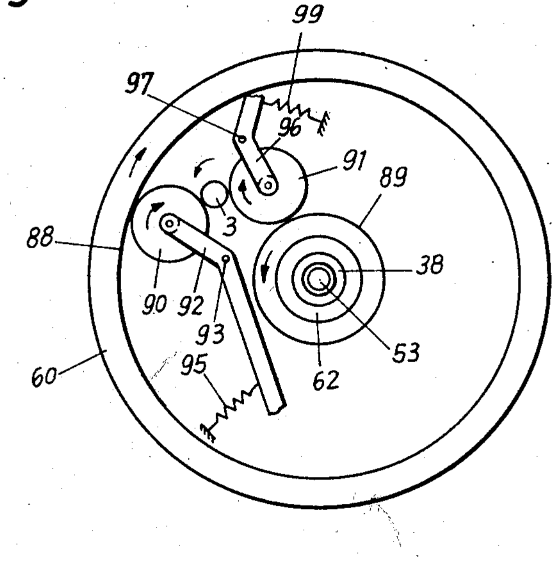
FIG. 8 is a diagrammatic illustration of the drive of the clamping drum.

It will now be explained with reference to FIG. 8 how the drive of the drum 9 may be effected with the present appliance in a particularly simple way. The end disc 60 has on its outside an annular recess 87 (see FIG. 3) bounded outside by an internal cylindrical friction surface 88 and inside by an external cylindrical friction surface 89, the radius of the latter being equal to one third of the radius of the outer friction surface. The left hand side end of the lay shaft 34 projects into the annular recess 87 and may be brought into driving connection by means of two friction wheels 90 and 91 at will with the outer friction surface 88 or with the inner friction surface 89 of the end disc 60.

The friction wheel 90 is journalled on an arm of a lever 92, which is pivotally mounted about a pin 93 and the other arm of which carries an armature (not shown), which may be attracted by an electro-magnet 94 (see FIG. 2) in a direction opposite to the bias of a spring 95. This spring 95 tends to keep the friction wheel 90 in contact with the lay shaft 34 and with the outer friction surface 38. When the electro-magnet 94 is energized no transmission of motion accordingly takes place from the lay shaft 34 to the end disc 60.

The friction wheel 91 is journalled in an analogous manner on one arm of a lever 96 which is mounted pivotally about a pin 97 and the other arm of which carries an armature (not shown) capable of being attracted by another electro-magnet 98 (see FIG. 2) in a direction opposite to the bias of a spring 99.

This spring 99 tends to keep the friction wheel 91 in contact with the lay shaft 34 and with the inner friction surface 89. From the arrows indicated in FIG. 8 it will be readily seen that with the friction wheel 91 being operative the clamping drum 9 is driven in the opposite sense as with the friction wheel 90 being operative, namely, at three times the speed owing to the aforesaid ratio of the radii of the friction surfaces 88 and 89. The run in the reverse required preparatory to "repetition" when the friction wheel 91 is operative takes place accordingly three times as fast as the forward run. The energizing and de-energizing, respectively, of the electro-magnets 94 and 98 is effected by the microphone key 27 in accordance with the manner of operation described. Obviously the springs 95 and 99 could conversely be so arranged that they tend to pull the friction wheels 90 and 91, respectively, away from their operative positions which wheels would then be brought into their operative positions by energizing their associated electro-magnets, 94, 98 respectively.

While I have described herein and illustrated in the accompanying drawings what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

1. A magnetic sound recording and reproducing dictation appliance comprising, a basic frame, a hollow axle shaft having one end supported by said frame, an expandable clamping drum overhung-mounted on said shaft, a manual operating knob arranged at the free end of said shaft and drum operable for controlling the expansion and contraction of said drum, a sleeve of magnetizable material having a helical guide groove on its circumference adapted to be clamped on the said drum, a transducer head slidably mounted for parallel movement relative to the said drum and pivotally relative to the same and in operation engaging the said guide groove, a control shaft extending through said hollow shaft with one end connected to said operating knob, means connecting the other end of said control shaft to the said transducer head for automatically and simultaneously lifting the same off the said drum when said control knob is operated to contract the drum and reduce the effective diameter of the said drum for the purpose of fitting or removing the said sleeve.

2. A magnetic sound recording and reproducing dictation appliance as claimed in claim 1, comprising two bars arranged parallel to the said drum and guiding the said transducer head slidably along the said drum, one of the said bars being mounted rotatably about its own axis in the said frame and the other bar being mounted pivotally about the axis of the said first mentioned bar, a two armed lever pivotally mounted on the said frame and having a ramp at one arm and a forked end at the other end of said arm, an abutment at the end of said controlling shaft engaging with the said forked end, the said ramp engaging the said pivotally mounted bar and upon axial movement of said axle swinging the said pivotally mounted bar away from the said drum thereby lifting the said transducer head out of engagement with said magnetizable sleeve simultaneously with the lifting of said transducer head.

3. A magnetic sound recording and reproducing dictation appliance as claimed in claim 1, wherein the said expandable drum has radially movable segments with internal conical end faces of opposite conicity and two end discs forming mutually engaging surfaces axially movable relative to one another and having external conical faces in sliding contact with the said internal conical faces, said end discs being mounted slidably on the said hollow shaft, tension spring means connecting the said end discs with, and biasing the same towards one another in the sense of forcing the said drum segments outwards by their said internal conical faces sliding upon the said external conical faces, the said operating knob being kinematically coupled to one of the said end discs in the sense of overcoming the bias of the said tension springs when operated.

4. A magnetic sound recording and reproducing dictation appliance as claimed in claim 3, comprising resilient rings embedded in annular grooves provided at the ends of the said drum segments and tending to pull the latter radially inwards.

5. A magnetic sound recording and reproducing dictation appliance as claimed in claim 3, comprising a transverse pin connected with the said operating knob for rotation, a face cam provided at the adjacent end of the said hollow shaft and co-operating with the said transverse pin, and an annular washer fixed to the adjacent one of the said end discs of the clamping drum and abutting the said transverse pin on the side opposite the said face cam.

6. A magnetic sound recording and reproducing dictation appliance as claimed in claim 5, wherein the said face cam has two equal sections each extending over 180° and each having an inner rest and an outer rest co-operating with the ends of the said transverse pin and a ramp extending between the said inner and outer rests, the said operating knob when turned continually in the same direction bringing the said transverse pin consecutively from the said outer rests into the said inner rests and vice versa, so as to expand and contract the said clamping drum, respectively.

7. A magnetic sound recording and reproducing dictation appliance as claimed in claim 5, comprising a pin co-axially served at one end to the said axle passing through the said hollow shaft, and fitted at its other hand with press fit into the said operating knob, the said transverse pin being mounted on the said co-axial pin.

References Cited by the Examiner

UNITED STATES PATENTS

| | | | |
|---|---|---|---|
| 1,569,797 | 1/26 | Wohrle | 346—68 X |
| 2,212,673 | 8/40 | Somers | 274—17 |
| 2,865,637 | 12/58 | Roberts et al. | 179—100.2 |
| 2,880,279 | 3/59 | Nickerson | 179—100.2 |
| 2,951,127 | 8/60 | Pierson et al. | 179—100.2 |

NORTON ANSHER, *Primary Examiner.*

BERNARD KONICK, *Examiner.*